US011668970B2

(12) United States Patent
Usukura

(10) Patent No.: US 11,668,970 B2
(45) Date of Patent: Jun. 6, 2023

(54) DISPLAY DEVICE

(71) Applicant: SHARP KABUSHIKI KAISHA, Sakai (JP)

(72) Inventor: Naru Usukura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/532,935

(22) Filed: Nov. 22, 2021

(65) Prior Publication Data

US 2022/0171234 A1 Jun. 2, 2022

Related U.S. Application Data

(60) Provisional application No. 63/119,943, filed on Dec. 1, 2020.

(51) Int. Cl.
*G02F 1/1335* (2006.01)
*G02F 1/1333* (2006.01)
(Continued)

(52) U.S. Cl.
CPC .. *G02F 1/133514* (2013.01); *G02F 1/133302* (2021.01); *G02F 1/133536* (2013.01);
(Continued)

(58) Field of Classification Search
CPC ......... G02F 1/133536; G02F 1/133533; G02F 1/133521; G02F 1/133514;
(Continued)

(56) References Cited

U.S. PATENT DOCUMENTS 6,545,739 B1 * 4/2003 Matsumoto ........ G02B 6/29358
349/198
2012/0092361 A1 * 4/2012 Saitoh .................... G02B 5/201
345/589

(Continued)

FOREIGN PATENT DOCUMENTS

JP 2010-019958 A 1/2010

OTHER PUBLICATIONS

SPIE (International Society for Optics and Photonics), "Nature of Color", citing Malacara, Color Vision and Colorimetry: Theory and Applications, Second Edition, SPIE Press, Bellingham, WA. Downloaded from spie.org/publications/pm105_11_color?SSO=1 on Sep. 8, 2022. (Year: 2011).*

*Primary Examiner* — Angela K Davison
(74) *Attorney, Agent, or Firm* — ScienBiziP, P.C.

(57) ABSTRACT

A display device includes: a color filter including a first transmissive filter, a second transmissive filter, and a third transmissive filter, the first, second and third transmissive filters being configured to transmit respective light beams having peak wavelengths different from each other; a first selective-wavelength-reflection layer adjacent to an optical-input surface of the first transmissive filter, the first selective-wavelength-reflection layer being configured to reflect light of a wavelength band that passes through the third transmissive filter; a second selective-wavelength-reflection layer adjacent to an optical-input surface of the second transmissive filter, the second selective-wavelength-reflection layer being configured to reflect light of a wavelength band that passes through the third transmissive filter, the second selective-wavelength-reflection layer being identical in composition to the first selective-wavelength-reflection layer; and a light emitter configured to emit light that travels toward the color filter.

17 Claims, 9 Drawing Sheets

(51) Int. Cl.
*G02F 1/13363* (2006.01)
*G02F 1/13357* (2006.01)

(52) U.S. Cl.
CPC .. *G02F 1/133603* (2013.01); *G02F 1/133621* (2013.01); *G02F 1/133638* (2021.01); *G02F 2203/02* (2013.01); *G02F 2203/055* (2013.01); *G02F 2203/06* (2013.01); *G02F 2203/07* (2013.01)

(58) Field of Classification Search
CPC ......... G02F 1/133603; G02F 1/133621; G02F 2203/02; G02F 2203/055; G02B 5/3041; G02B 5/32; G02B 5/28; G02B 5/22
See application file for complete search history.

(56) References Cited

U.S. PATENT DOCUMENTS

2014/0085567 A1* 3/2014 Im ..................... G02F 1/133555
349/62
2020/0400983 A1* 12/2020 Komura ............ G02F 1/133621

\* cited by examiner

DISPLAY DEVICE

CROSS-REFERENCE TO RELATED APPLICATION

The present application claims priority from Provisional Application 63/119,943, the content to which is hereby incorporated by reference into this application.

BACKGROUND OF THE INVENTION

1. Field of the Invention

The disclosure relates to a display device.

2. Description of the Related Art

Japanese Patent Application Laid-Open No. 2010-19958 discloses a display device (liquid-crystal display panel) that includes a color filter provided with transmissive filters that transmit red light, green light, and blue light selectively. In the display device, the transmissive filter for red light has an optical-input surface provided with a selective-wavelength-reflection layer that selectively reflects a color of light having a shorter wavelength band than the transmission wavelength of the red-light transmissive filter. In addition, the transmissive filter for green light has an optical-input surface provided with a selective-wavelength-reflection layer that selectively reflects a color of light having a shorter wavelength band than the transmission wavelength of the green-light transmissive filter.

To use light effectively, the display device disclosed in Japanese Patent Application Laid-Open No. 2010-19958 includes, as described above, selective-wavelength-reflection layers having different types of composition, i.e., the selective-wavelength-reflection layer that selectively reflects a color of light having a shorter wavelength band than the transmission wavelength of the red-light transmissive filter, and the selective-wavelength-reflection layer that selectively reflects a color of light having a shorter wavelength band than the transmission wavelength of the green-light transmissive filter.

SUMMARY

Unfortunately, the display device disclosed in Japanese Patent Application Laid-Open No. 2010-19958 requires two different selective-wavelength-reflection layers and thus has a complicated configuration.

One aspect of the present disclosure provides a display device that can effectively use, with a simple configuration, light emitted from a light source.

(1) A display device according to a first aspect of the present disclosure includes a color filter including a first transmissive filter, a second transmissive filter, and a third transmissive filter. The first, second and third transmissive filters transmit respective light beams having peak wavelengths different from each other. The display device also includes a first selective-wavelength-reflection layer adjacent to an optical-input surface of the first transmissive filter. The first selective-wavelength-reflection layer reflects light of a wavelength band that passes through the third transmissive filter. The display device also includes a second selective-wavelength-reflection layer adjacent to an optical-input surface of the second transmissive filter. The second selective-wavelength-reflection layer reflects light of a wavelength band that passes through the third transmissive filter. The second selective-wavelength-reflection layer is identical in composition to the first selective-wavelength-reflection layer. The display device also includes a light emitter that emits light that travels toward the color filter.

(2) In a second aspect of the present disclosure, the display device according to the first aspect of the present disclosure may be configured such that the first and second selective-wavelength-reflection layers are composed of a single structure.

(3) In a third aspect of the present disclosure, the display device according to the first aspect of the present disclosure may be configured such that the first and second selective-wavelength-reflection layers are composed of respective separate structures.

(4) In a fourth aspect of the present disclosure, the display device according to any one of the first to third aspects may be configured such that the first transmissive filter includes a red transmissive filter that transmits light of a wavelength band ranging at least from 620 nm inclusive to 680 nm inclusive, such that the second transmissive filter includes a green transmissive filter that transmits light of a wavelength band ranging at least from 520 nm inclusive to 580 nm inclusive, such that the third transmissive filter includes a blue transmissive filter that transmits light of a wavelength band ranging at least from 420 nm inclusive to 480 nm inclusive, and such that the first and second selective-wavelength-reflection layers reflect the light of the wavelength band ranging at least from 420 nm inclusive to 480 nm inclusive.

(5) In a fifth aspect of the present disclosure, the display device according to the fourth aspect may be configured such that the red, green, and blue transmissive filters are arranged so as to respectively correspond to a red sub-pixel, a green sub-pixel, and a blue sub-pixel, and such that the blue transmissive filter in the color filter is smaller in area than each of the red and green transmissive filters in the color filter.

(6) In a sixth aspect of the present disclosure, the display device according to any one of the first to fifth aspects may include the following: a liquid crystal layer; and a first glass substrate and a second glass substrate sandwiching the liquid crystal layer and each having an electrode. The display device may be configured such that the liquid crystal layer and the first glass substrate are adjacent to an optical-input surface of the color filter, such that the second glass substrate is adjacent to an optical-output surface of the color filter, and such that the first and second selective-wavelength-reflection layers are disposed between the liquid crystal layer and the first glass substrate.

(7) In a seventh aspect of the present disclosure, the display device according to any one of the first to fifth aspects may include the following: a liquid crystal layer; and a first glass substrate and a second glass substrate sandwiching the liquid crystal layer and each having an electrode. The display device may be configured such that the first glass substrate is adjacent to an optical-input surface of the color filter, such that the liquid crystal layer and the second glass substrate are adjacent to an optical-input surface of the color filter, and such that the first and second selective-wavelength-reflection layers are disposed between the color filter and the first glass substrate.

(8) In an eighth aspect of the present disclosure, the display device according to any one of the first to seventh aspects may be configured such that the first and second selective-wavelength-reflection layers are composed of a polarization-independent reflective member.

(9) In a ninth aspect of the present disclosure, the display device according to any one of the first to seventh aspects may be configured such that the first and second selective-wavelength-reflection layers are composed of a reflective member that reflects circularly polarized light.

(10) In a tenth aspect of the present disclosure, the display device according to the ninth aspect may be configured such that the first and second selective-wavelength-reflection layers are composed of a reflective member having a stack of a first reflective member and a second reflective member. The first reflective member reflects counterclockwise-circularly polarized light. The second reflective member reflects clockwise-circularly polarized light.

(11) In an eleventh aspect of the present disclosure, the display device according to the ninth or tenth aspect may include a first waveplate adjacent to optical-input surfaces of the first and second selective-wavelength-reflection layers. The first waveplate converts linearly polarized incident light into circularly polarized light. The display device may also include a second waveplate adjacent to optical-output surfaces of the first and second selective-wavelength-reflection layers. The second waveplate converts circularly polarized incident light into linearly polarized light.

(12) In a twelfth aspect of the present disclosure, the display device according to any one of the first to fifth aspects may include a liquid crystal layer, a first polarizer plate adjacent to an optical-input surface of the liquid crystal layer, and a second polarizer plate adjacent to an optical-output surface of the liquid crystal layer. The display device may be configured such that the first polarizer plate includes a third polarizer plate adjacent to optical-input surfaces of the first and second selective-wavelength-reflection layers, and a fourth polarizer plate adjacent to optical-output surfaces of the first and second selective-wavelength-reflection layers.

(13) In a thirteenth aspect of the present disclosure, the display device according to the twelfth aspect may be configured such that the third polarizer plate includes a reflective polarizer plate that reflects a component of polarized light that is not allowed to pass through the third polarizer plate, and such that the fourth polarizer plate includes an absorptive polarizer plate that absorbs a component of polarized light that is not allowed to pass through the fourth polarizer plate.

(14) In a fourteenth aspect of the present disclosure, the display device according to any one of the first to thirteenth aspects may be configured such that the light emitter is an LED light source that emits three colors of light composed of R, G, and B.

DETAILED DESCRIPTION

The preferred embodiment and its modifications of the present disclosure will be described with reference to the drawings. Identical or corresponding components will be denoted by the same signs throughout the drawings, and redundancies will not be described. The preferred embodiment and its modifications are mere examples of the present disclosure, and the present disclosure is thus not limited to the preferred embodiment and its modifications. Various modifications other than the preferred embodiment and its modifications can be devised in accordance with design and other things, within a scope not departing from the technical idea of the present disclosure.

Figure 1:
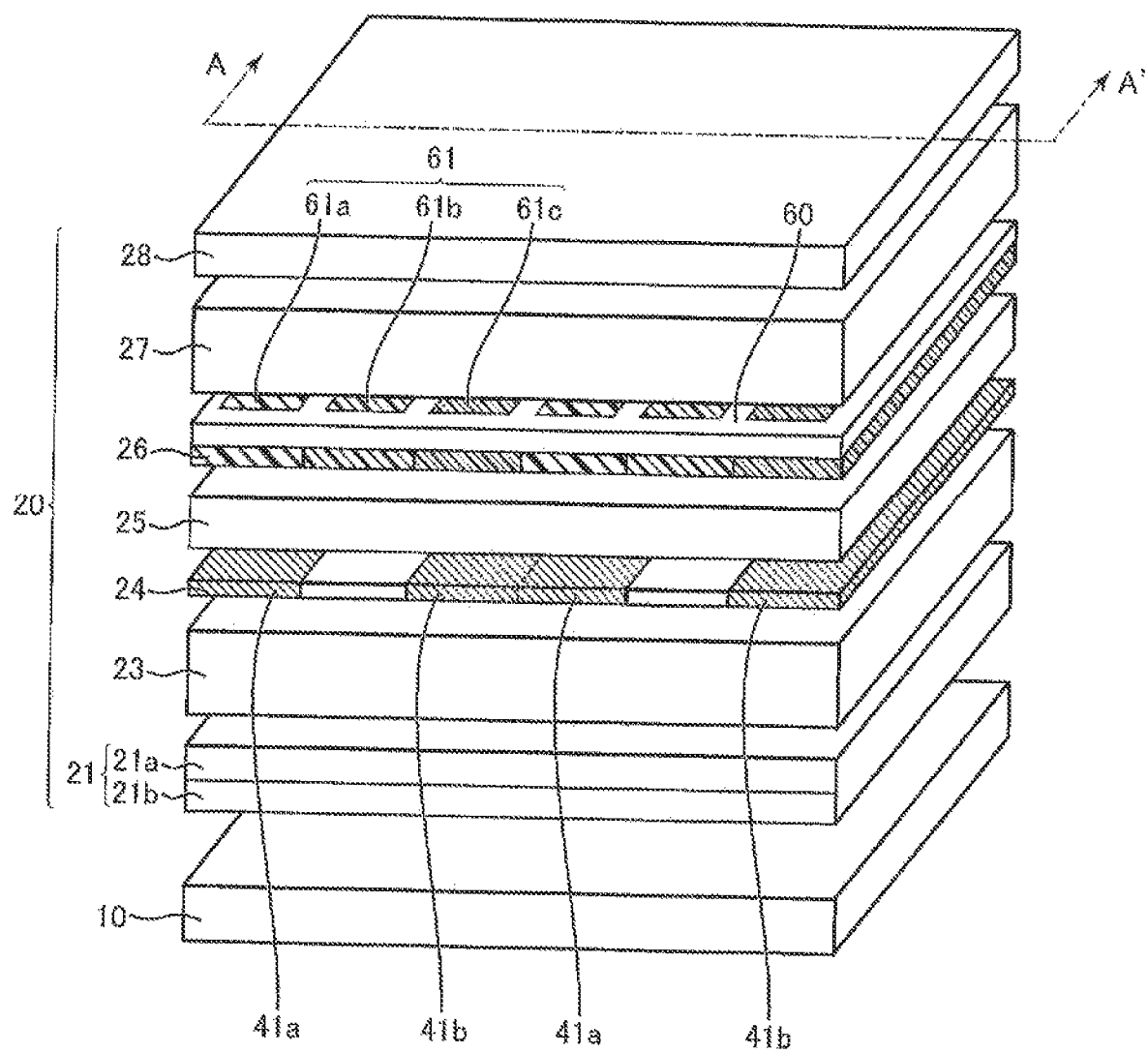
FIG. 1 is a schematic perspective view of a display device according to a preferred embodiment of the present disclosure.
Figure 2:
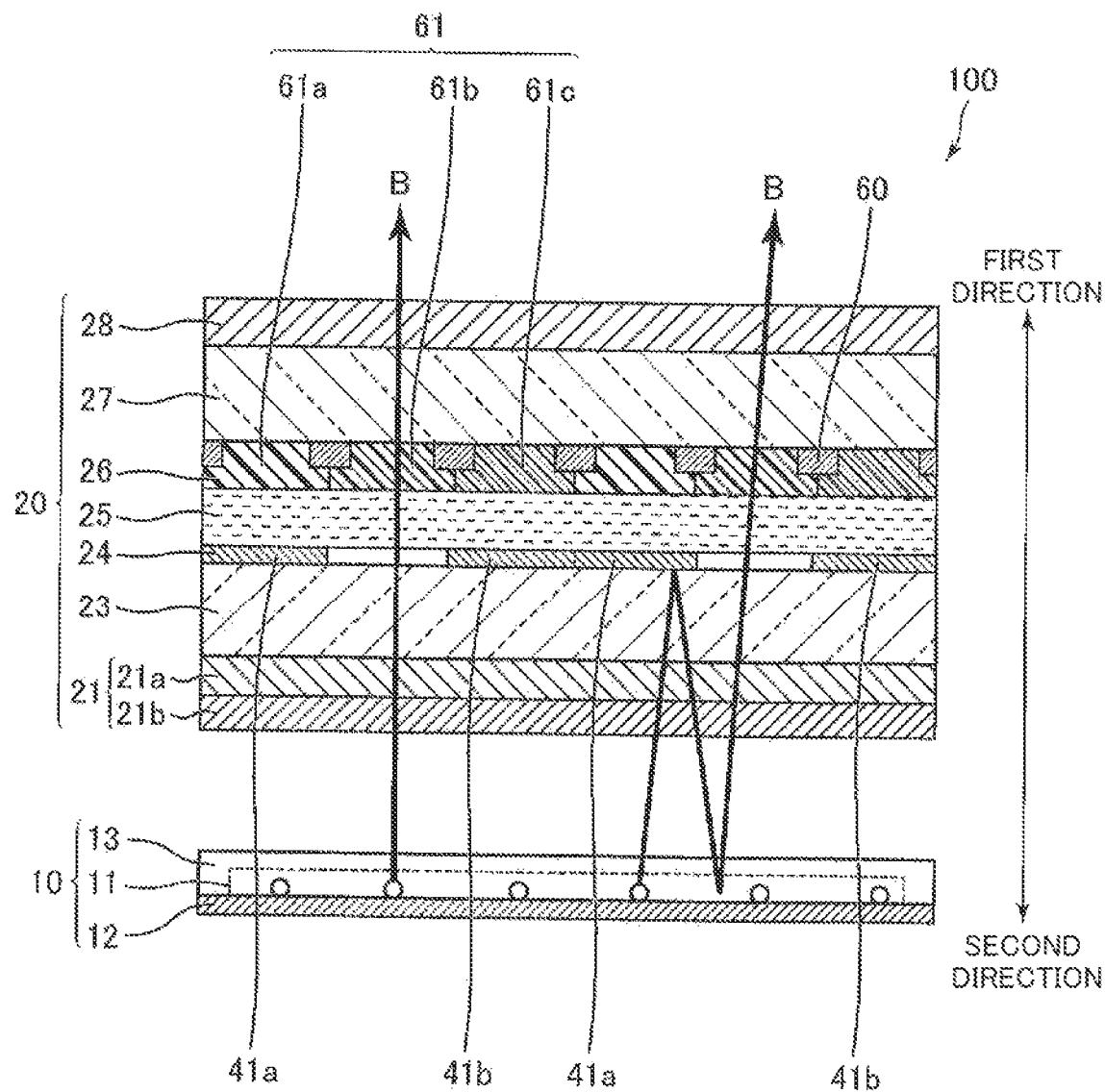
FIG. 2 is a schematic sectional view of the display device taken along line A-A' in FIG. 1.

A display device 100 according to the preferred embodiment will be described with reference to FIGS. 1 and 2. FIG. 1 is a schematic perspective view of the display device 100 according to the preferred embodiment of the present disclosure. FIG. 2 is a schematic sectional view of the display device 100 taken along line A-A' in FIG. 1. FIGS. 1 and 2 omit a pair of electrodes (e.g., a pixel electrode and a counter electrode) sandwiching a liquid crystal layer 25.

The display device 100 according to the preferred embodiment includes a backlight 10 on its back surface. The display device 100 is a transmissive liquid crystal display that irradiates a liquid crystal cell 20 with light from the backlight 10. The display device 100 in FIG. 1 lies with its back surface on the lower side of the drawing sheet and with its display surface, having a display region for image display, on the upper side of the drawing sheet. The Specification describes where individual components are disposed in relation to each other on the basis of the fact that the back surface is on the lower side and that the display surface is on the upper side.

The liquid crystal cell 20 includes the following disposed on the back surface sequentially: a first polarizer plate 21, a first glass substrate 23, a reflective layer 24, a liquid crystal layer 25, a color filter 26, a second glass substrate 27, and a second polarizer plate 28. The first polarizer plate 21 includes an absorptive polarizer plate 21a and a reflective polarizer plate 21b. The reflective layer 24 includes a first selective-wavelength-reflection layer 41a and a second selective-wavelength-reflection layer 41b.

As illustrated in FIG. 2, the backlight 10 includes the following: a light emitter 11 with a plurality of light sources equally arranged directly under the liquid crystal cell 20; a reflector 12 disposed on the back surface of the light emitter 11; and a light guide 13 that diffuses light emitted from the light emitter 11 and then guides the light toward the liquid crystal cell 20. The backlight 10 is a direct-lit backlight where the liquid crystal cell 20 is directly irradiated with light emitted from the light emitter 11. Instead of such a direct-lit type, the backlight 10 may be an edge-lit backlight of the following configuration. That is, the backlight 10 may be configured such that the light guide 13 guides light emitted from the light emitter 11 disposed near the side of the liquid crystal cell 20, and such that the reflector 12 reflects the light guided by the light guide 13 and then radiates the light toward the liquid crystal cell 20.

The Specification defines the direction of travel of light from the backlight 10 toward the liquid crystal cell 20 as a first direction; in other words, the first direction refers to a direction where light travels from the back surface toward the display surface. The Specification also defines the direction of travel of light opposite to the first direction as a second direction.

The light emitter 11 emits light including visible light and may be, for instance, a white light-emitting diode (LED) that emits white light. Alternatively, the light emitter 11 may be an LED (RGB-LED) that emits three colors of light composed of R, G, and B. In the Specification, the wavelength of visible light ranges from 380 nm inclusive to 800 nm exclusive.

The color filter 26 includes a red transmissive filter 61a (first transmissive filter), a blue transmissive filter 61b (third transmissive filter), and a green transmissive filter 61c (second transmissive filter). The three transmissive filters transmit light beams having their peak wavelengths different from each other. In the display device 100 according to the preferred embodiment, the red transmissive filter 61a transmits light including a peak wavelength (e.g., 630 nm) and having a wavelength band ranging at least from 620 nm inclusive to 680 nm inclusive. In addition, the blue transmissive filter 61b transmits light including a peak wavelength (e.g., 450 nm) and having a wavelength band ranging at least from 420 nm inclusive to 480 nm inclusive. In addition, the green transmissive filter 61c transmits light including a peak wavelength (e.g., 540 nm) and having a wavelength band ranging at least from 520 nm inclusive to 580 nm inclusive. The red transmissive filter 61a, the blue transmissive filter 61b, and the green transmissive filter 61c are referred to as merely as transmissive filters 61 in some cases when there is no need to particularly distinguish these filters from each other.

Each of the red transmissive filter 61a, blue transmissive filter 61b and green transmissive filter 61c is a rectangular flat plate, as illustrated in FIGS. 1 and 2. The red transmissive filter 61a, the blue transmissive filter 61b, and the green transmissive filter 61c are arranged in this order from the left of the drawing sheets so as to be adjacent from each other along their longer sides.

These transmissive filters 61 have their optical-output main surfaces provided with a black matrix 60. The black matrix 60 is in the form of a lattice along the boundaries between the transmissive filters 61. As described, the color filter 26, which includes the black matrix 60 in the form of a lattice along the boundaries between the transmissive filters 61, can prevent color mixture in the color filter 26 and prevent light leakage from the backlight 10. The color filter 26 may further include an overcoat layer, an indium tin oxide (ITO) layer, and other things, all of which are not shown.

The display device 100 also includes the first selective-wavelength-reflection layer 41a adjacent to the optical-input surface of the red transmissive filter 61a and designed to reflect light of a wavelength band that passes through the blue transmissive filter 61b. The display device 100 also includes the second selective-wavelength-reflection layer 41b adjacent to the optical-input surface of the green transmissive filter 61c and designed to reflect light of a wavelength band that passes through the blue transmissive filter 61b.

Both of the first selective-wavelength-reflection layer 41a and second selective-wavelength-reflection layer 41b are selective-wavelength-reflection layers that reflect light of a wavelength band that passes through the blue transmissive filter 61b, and both are identical in composition. The first selective-wavelength-reflection layer 41a and the second selective-wavelength-reflection layer 41b can be formed in the same layer. The first selective-wavelength-reflection layer 41a and the second selective-wavelength-reflection layer 41b are composed of a single structure. The first selective-wavelength-reflection layer 41a and second selective-wavelength-reflection layer 41b of the display device 100 according to the preferred embodiment can be thus formed through the same process steps. Here, the region between the first selective-wavelength-reflection layer 41a and second selective-wavelength-reflection layer 41b, i.e., a region without a selective-wavelength-reflection layer, is filled with a transparent layer. This transparent filler layer can prevent unevenness between the first selective-wavelength-reflection layer 41a and the region without a selective-wavelength-reflection layer as well as between the second selective-wavelength-reflection layer 41b and the region without a selective-wavelength-reflection layer. Such a transparent layer may be omitted when the first selective-wavelength-reflection layer 41a and the second selective-wavelength-reflection layer 41b are thin, so that light leakage, resulting from such unevenness between these selective-wavelength-reflection layers and the region without a selective-wavelength-reflection layer, less has an effect.

The first selective-wavelength-reflection layer 41a and the second selective-wavelength-reflection layer 41b can be composed of a polarization-independent reflective member, such as a hologram or a thin multi-layer interference film. This configuration, where the first selective-wavelength-reflection layer 41a and the second selective-wavelength-reflection layer 41b are composed of a reflective member, such as a hologram or a thin multi-layer interference film, enables reflection of light of a wavelength band that passes through the blue transmissive filter 61b, without depending on the polarization of incident light.

As illustrated in FIGS. 1 and 2, the first selective-wavelength-reflection layer 41a is disposed on the optical-input surface of the liquid crystal layer 25, in other words, on a surface of the liquid crystal layer 25 adjacent to the backlight 10, and is disposed in a location corresponding to a range of passage of light incident on the red transmissive filter 61a. In addition, the second selective-wavelength-reflection layer 41b is disposed on the optical-input surface of the liquid crystal layer 25, in other words, on the surface of the liquid crystal layer 25 adjacent to the backlight 10, and is disposed in a location corresponding to a range of passage of light incident on the green transmissive filter 61c.

A light beam incident on the red transmissive filter 61a and a light beam incident on the green transmissive filter 61c thus respectively pass through the first selective-wavelength-reflection layer 41a and the second selective-wavelength-reflection layer 41b without fail. The red transmissive filter 61a and the green transmissive filter 61c hence receive light excluding light of a wavelength band that passes through the blue transmissive filter 61b.

With reference to FIG. 2, the following details the path of light emitted from the backlight 10. Reference is herein made to light (B) including a peak wavelength that constitutes blue emitted light.

As illustrated in FIG. 2, light (B) from the backlight 10 enters the first polarizer plate 21, which has a transmission axis in a predetermined direction. Only light (B) entered the first polarizer plate 21 and oscillating in a predetermined direction passes through the first polarizer plate 21. The first polarizer plate 21 includes the absorptive polarizer plate 21a and the reflective polarizer plate 21b, as illustrated in FIGS. 1 and 2, and is designed to allow only light oscillating in a predetermined direction (i.e., only a component of polarized light to be transmitted) to pass therethrough properly.

The light (B) passed through the first polarizer plate 21 passes through the first glass substrate 23 and then enters the liquid crystal layer 25. Here, the first selective-wavelength-reflection layer 41a, provided in correspondence with a range of passage of light (B) incident on the red transmissive filter 61a, and the second selective-wavelength-reflection layer 41b, provided in correspondence with a range of passage of light (B) incident on the green transmissive filter 61c, are arranged on a surface of the liquid crystal layer 25 that receives light (B).

Here, light (B) travelling toward the blue transmissive filter 61b enters, as-is, the blue transmissive filter 61b through the liquid crystal layer 25. In contrast, a light beam (B) travelling toward the red transmissive filter 61a and a light beam (B) travelling toward the green transmissive filter 61c reflect on the first selective-wavelength-reflection layer 41a and the second selective-wavelength-reflection layer 41b.

The light beams (B) reflected on the respective first selective-wavelength-reflection layer 41a and second selective-wavelength-reflection layer 41b travel in the second direction. The light traveling in the second direction passes through the first glass substrate 23 and then through the first polarizer plate 21 to enter the backlight 10. The light entered the backlight 10 reflects on the reflector 12 of the backlight 10 and again travels in the first direction.

Light (B) reflected on the reflector 12 and traveling toward the blue transmissive filter 61b enters the blue transmissive filter 61b through the liquid crystal layer 25. In contrast, light (B) reflected on the reflector 12 and traveling toward the red transmissive filter 61a and green transmissive filter 61c reflects again on the first selective-wavelength-reflection layer 41a and second selective-wavelength-reflection layer 41b.

The light (B) entered the blue transmissive filter 61b passes through the blue transmissive filter 61b and then exits via the second glass substrate 27 and second polarizer plate 28. That is, the liquid crystal layer 25 contains a group of liquid-crystal molecules sandwiched by a pair of alignment films (not shown), by which these molecules are aligned so as to be 90 degrees twisted. Hence light (B) entered the liquid crystal layer 25 exits from the liquid crystal layer 25 while being twisted 90 degrees. The light (B) then passes through the second polarizer plate 28, which has a transmission axis shifted 90 degrees from the transmission axis of the first polarizer plate 21.

In the foregoing configuration, light (B) passes through the blue transmissive filter 61b without being absorbed by the red transmissive filter 61a and green transmissive filter 61c. This achieves effective use of light (B) emitted from the backlight 10.

The first selective-wavelength-reflection layer 41a and the second selective-wavelength-reflection layer 41b can be identical in composition. The first selective-wavelength-reflection layer 41a and the second selective-wavelength-reflection layer 41b are composed of a single structure.

These layers hence offer a simpler configuration than those different from each other in composition, thereby achieving effective use of light emitted from a light source.

Furthermore, the first selective-wavelength-reflection layer 41a and the second selective-wavelength-reflection layer 41b do not have to be manufactured individually, unlike Japanese Patent Application Laid-Open No. 2010-19958, which provides a display device that includes selective-reflection layers different from each other in composition for each transmissive filter. The display device 100 can be thus manufactured through less process steps.

A display device that includes a plurality of selective-reflection layers different from each other in composition for each transmissive filter involves differences in thickness between the selective-wavelength-reflection layers, thus producing asperities between the selective-wavelength-reflection layers. Such asperities cause scattering of light passed through the transmissive filters at the asperities, thereby possibly degrading contrast.

The display device 100 according to the preferred embodiment in contrast is configured such that the first selective-wavelength-reflection layer 41a and the second selective-wavelength-reflection layer 41b are identical in composition and composed of a single structure. This produces no asperities between the selective-wavelength-reflection layers. The display device 100 according to the preferred embodiment can thus avoid light scatter resulting from such asperities.

The display device 100 according to the preferred embodiment can consequently avoid contrast degradation while minimizing the number of process steps.

The foregoing has described, by way of example, light (B) including a peak wavelength constitutes blue emitted light, which is non-limiting; any light may be reflected by the first selective-wavelength-reflection layer 41a and second selective-wavelength-reflection layer 41b. Examples of light that may be reflected by these reflection layers include light (R) having a peak wavelength that constitutes red emitted light and light (G) having a peak wavelength that constitutes green emitted light.

Using an RGB-LED as the light emitter 11 of the backlight 10 more easily distinguishes the wavelength bands of respective R, G and B from each other than using, for instance, a white LED as the light emitter 11. Consequently, the wavelength bands of light beams that are reflected by the respective first selective-wavelength-reflection layer 41a and second selective-wavelength-reflection layer 41b are distinguished from each other easily. This can enhance the accuracy of light of a reflected wavelength band and eliminate or minimize the effect of the viewing angle dependence of light that is reflected by the first selective-wavelength-reflection layer 41a and second selective-wavelength-reflection layer 41b.

The foregoing has described, by way of example, that the first selective-wavelength-reflection layer 41a and the second selective-wavelength-reflection layer 41b are composed of a polarization-independent reflective member. When light traveling through the liquid crystal cell 20 becomes circularly polarized light for instance, these reflection layers may be composed of a cholesteric liquid crystal or chiral nematic liquid crystal that reflects circularly polarized light (elliptically polarized light). Herein, a wave in which light oscillates in such a manner that the amplitude of the light moves in a circle along with time is referred to as circularly polarized light. In addition, light whose amplitude rotates clockwise along with time when viewed from the back of the direction of travel of the light is referred to as clockwise-circularly polarized light, and light whose amplitude rotates counterclockwise along with time when viewed similarly is referred to as counterclockwise-circularly polarized light.

When composed of a cholesteric liquid crystal or chiral nematic liquid crystal and receiving light (B) that is circularly polarized light, the first selective-wavelength-reflection layer 41a and the second selective-wavelength-reflection layer 41b can efficiently reflect light having a particular wavelength band, which is herein light (B) for instance.

Whether the first selective-wavelength-reflection layer 41a and the second selective-wavelength-reflection layer 41b reflect clockwise- or counterclockwise-circularly polarized light can be controlled at the time of producing the first selective-wavelength-reflection layer 41a and second selective-wavelength-reflection layer 41b. For instance, clockwise and counterclockwise directions can be controlled by putting a chiral agent into a cholesteric liquid crystal, followed by exposing the cholesteric liquid crystal to light after determining which of clockwise- and counterclockwise-circularly polarized light is to be reflected.

First Modification

Figure 3:
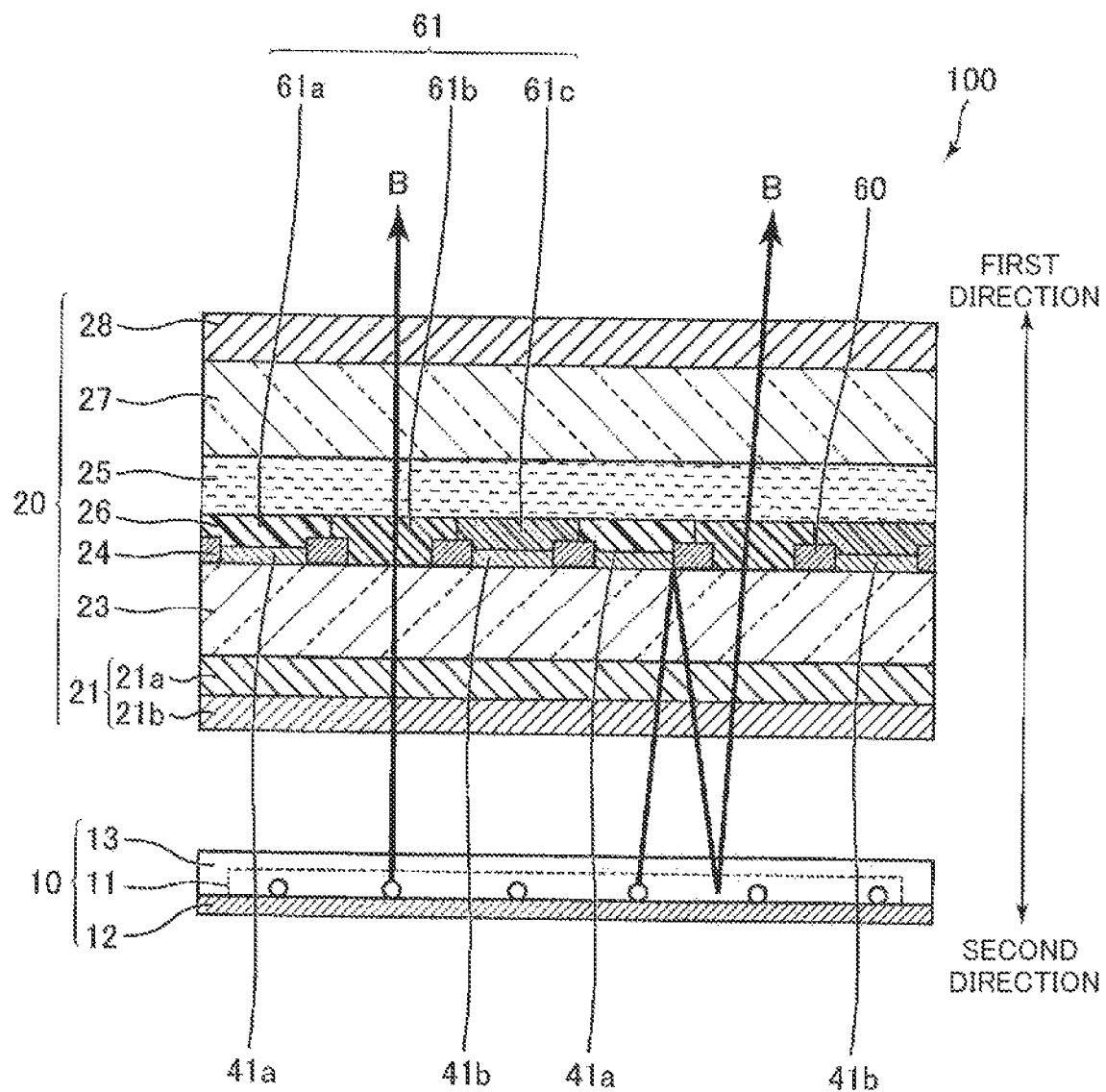
FIG. 3 is a schematic sectional view of the display device according to a first modification of the preferred embodiment of the present disclosure.

The display device 100 according to the preferred embodiment is configured such that the liquid crystal layer 25 and the first glass substrate 23 are adjacent to the optical-input surface of the color filter 26, and such that the second glass substrate 27 is adjacent to the optical-output surface of the color filter 26. The display device 100 is also configured such that the reflective layer 24 (the first selective-wavelength-reflection layer 41a and second selective-wavelength-reflection layer 41b) is interposed between the liquid crystal layer 25 and first glass substrate 23. The configuration of the display device 100 is not limited to the foregoing. For instance, FIG. 3 illustrates the display device 100 according to a first modification of the preferred embodiment, where the first glass substrate 23 is adjacent to the optical-input surface of the color filter 26, and the liquid crystal layer 25 and the second glass substrate 27 are adjacent to the optical-output surface of the color filter 26. In addition, the reflective layer 24 may be interposed between the color filter 26 and first glass substrate 23. FIG. 3 is a schematic sectional view of the display device 100 according to the first modification of the preferred embodiment of the present disclosure.

In the display device 100 according to the first modification of the preferred embodiment 1, the black matrix 60 is disposed on a main surface of the color filter 26 where light enters, in the form of a lattice along the boundaries between the transmissive filters 61, as illustrated in FIG. 3. The reflective layer 24 in a region surrounded by the black matrix 60 is in contact with this optical-input main surface of the color filter 26.

As described above, the display device 100 according to the first modification of the preferred embodiment 1 is similar in configuration to the display device 100 according to the preferred embodiment 1 with the exception that the arrangement of the reflective layer 24, color filter 26 and liquid crystal layer 25 is different. Like components will be thus denoted by the same signs and will not be elaborated upon here.

Although not shown in FIGS. 2 and 3, the display device 100 according to the first modification includes thin-film transistors (TFTs) and pixel electrodes both disposed on an inner main surface of the first glass substrate 23. On the TFTs is the color filter 26; this configuration is called a color filter on array (COA). Herein, the inner main surface of the first glass substrate 23 is a main surface of the first glass substrate 23 where light exits when light exited from the backlight 10 travels in the first direction.

A COA configuration like the display device 100 according to the first modification enables strict positioning between the pixel electrodes and color filter 26. The COA configuration can also prevent color mixture, which is caused by a shift in the relative position between the TFTs and color filter 26 that occurs when the liquid crystal cell 20 with flexibility is bent.

Reference is made to the relationship in position between the TFTs and the first selective-wavelength-reflection layer 41a and second selective-wavelength-reflection layer 41b. To avoid light absorption in the TFTs, the first selective-wavelength-reflection layer 41a and the second selective-wavelength-reflection layer 41b are preferably disposed closer to the backlight 10 than the TFTs are. However in process steps for producing the liquid crystal cell 20, the process temperature of the TFTs is around 600 degrees, whereas the first selective-wavelength-reflection layer 41a and the second selective-wavelength-reflection layer 41b have a lower heat-resistance temperature. For a cholesteric liquid crystal for instance, the first selective-wavelength-reflection layer 41a and the second selective-wavelength-reflection layer 41b have a heat-resistance temperature of 200 degrees. The first selective-wavelength-reflection layer 41a and the second selective-wavelength-reflection layer 41b are thus in reality formed after the TFTs and the pixel electrodes are formed onto the first glass substrate 23.

With reference to FIG. 3, the following details the path of light emitted from the backlight 10. Reference is herein made to light (B) including a peak wavelength that constitutes blue emitted light.

As illustrated in FIG. 3, light (B) from the backlight 10 enters the first polarizer plate 21. Only light (B) entered the first polarizer plate 21 and oscillating in a predetermined direction passes through the first polarizer plate 21.

The light (B) passed through the first polarizer plate 21 passes through the first glass substrate 23 and then enters the color filter 26. Here, the first selective-wavelength-reflection layer 41a, provided in correspondence with a range of passage of light (B) incident on the red transmissive filter 61a, and the second selective-wavelength-reflection layer 41b, provided in correspondence with a range of passage of light (B) incident on the green transmissive filter 61c, are arranged on a surface of the color filter 26 that receives light (B).

Light (B) travelling toward the blue transmissive filter 61b thus passes, as-is, through the blue transmissive filter 61b to enter the liquid crystal layer 25. In contrast, light (B) travelling toward the red transmissive filter 61a and light (B) travelling toward the green transmissive filter 61c reflects on the first selective-wavelength-reflection layer 41a and the second selective-wavelength-reflection layer 41b.

The light beams (B) reflected on the respective first selective-wavelength-reflection layer 41a and second selective-wavelength-reflection layer 41b travel in the second direction. The light traveling in the second direction passes through the first glass substrate 23 and then through the first polarizer plate 21 to enter the backlight 10. The light entered the backlight 10 reflects on the reflector 12 and again travels in the first direction.

Light (B) reflected and traveling toward the blue transmissive filter 61b passes through the blue transmissive filter 61b and then enters the liquid crystal layer 25. In contrast, light (B) traveling toward the red transmissive filter 61a and green transmissive filter 61c reflects again on the first selective-wavelength-reflection layer 41a and second selective-wavelength-reflection layer 41b.

The light (B) passed through the blue transmissive filter 61b and then entered the liquid crystal layer 25 exits via the second glass substrate 27 and second polarizer plate 28.

The display device 100 according to the first modification may have an inverted structure described below. As earlier described, the display device 100 according to the first modification is structured such that the TFTs and the pixel electrodes are arranged on the inner main surface of the first glass substrate 23. The display device 100 is also structured such that a counter electrode is disposed on an inner main surface of the second glass substrate 27.

This structure may be inverted; that is, the counter electrode is disposed on the inner main surface of the first glass substrate 23, and the TFTs and the pixel electrodes are arranged on the inner main surface of the second glass substrate 27. Herein, the inner main surface of the second glass substrate 27 is a main surface of the second glass substrate 27 where light enters when light exited from the backlight 10 travels in the first direction.

With such an inverted structure, the display device 100 according to the first modification enables the ratio of light distribution to be specified based on the size of the black matrix 60. In addition, the black matrix 60 that is made of a high-reflectivity material can efficiently reflect light emitted from the backlight 10, thus improving the utilization factor of light in the display device 100.

Second Modification

Figure 4:
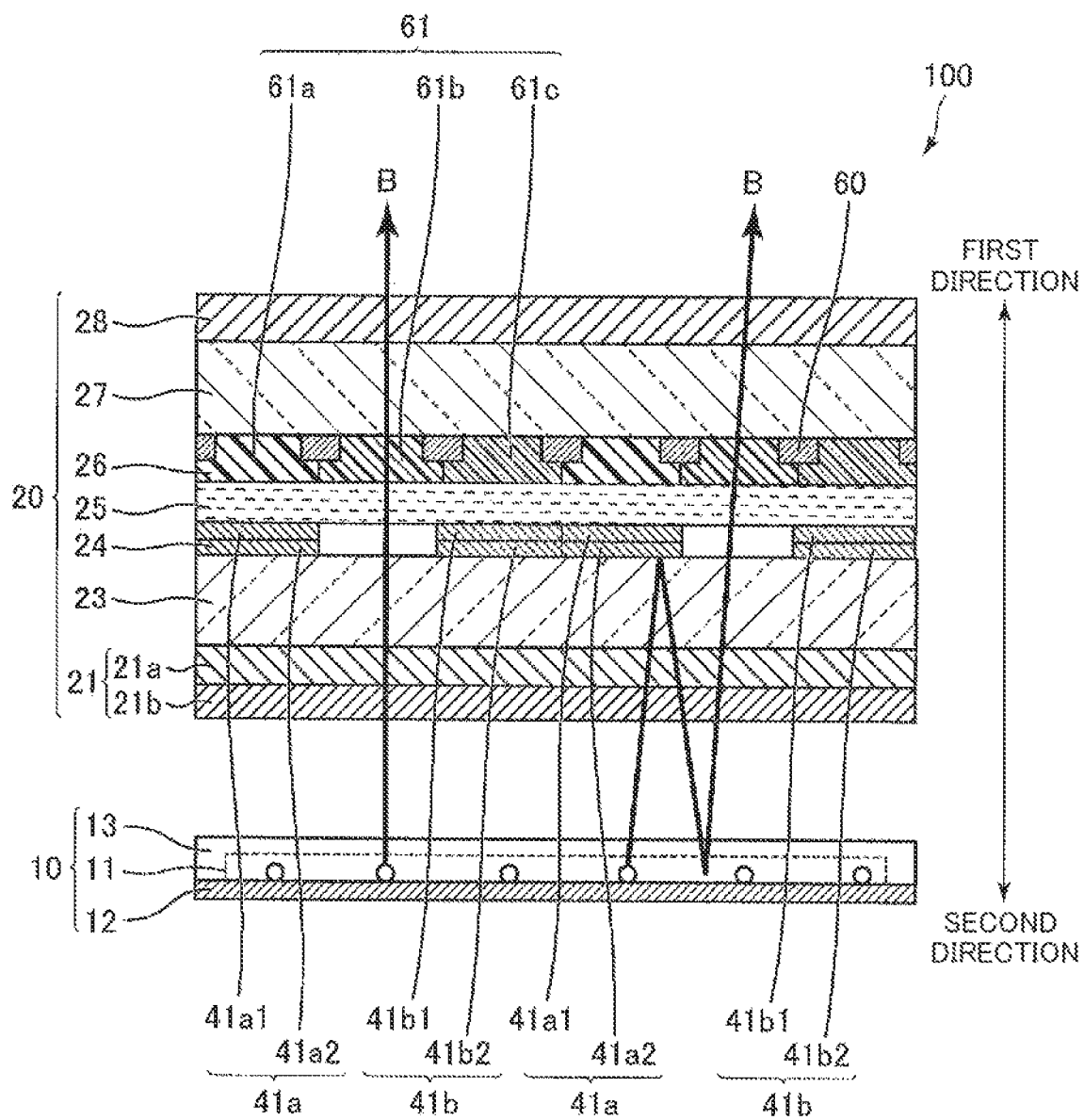
FIG. 4 is a schematic sectional view of the display device according to a second modification of the preferred embodiment of the present disclosure.

With reference to FIG. 4, the following describes the display device 100 according to a second modification of the preferred embodiment. FIG. 4 is a schematic sectional view of the display device 100 according to the second modification of the preferred embodiment of the present disclosure. The display device 100 according to the second modification is different in configuration from the display device 100 according to the preferred embodiment in the following points.

One of the differences is that the first selective-wavelength-reflection layer 41a is composed of a reflective member having a stack of a first circularly-polarized-light reflection member 41a1 (a first reflective member) and a second circularly-polarized-light reflection member 41a2 (a second reflective member). The first circularly-polarized-light reflection member 41al reflects one of clockwise- and counterclockwise-circularly polarized light beams, and the second circularly-polarized-light reflection member 41a2 reflects the other circularly polarized light beam. The other difference is that the second selective-wavelength-reflection layer 41b is composed of a reflective member having a stack of a third circularly-polarized-light reflection member 41b1 (a first reflective member) and a fourth circularly-polarized-light reflection member 41b2 (a second reflective member). The third circularly-polarized-light reflection member 41b1 reflects one of clockwise- and counterclockwise-circularly polarized light beams, and the fourth circularly-polarized-light reflection member 41b2 reflects the other circularly polarized light beam.

That is, the first circularly-polarized-light reflection member 41al and the third circularly-polarized-light reflection member 41b1 are identical in composition and formed in the same layer; in addition, the second circularly-polarized-light reflection member 41a2 and the fourth circularly-polarized-light reflection member 41b2 are identical in composition and formed in the same layer. The first selective-wavelength-reflection layer 41a and the second selective-wavelength-reflection layer 41b are identical in composition and composed of a single structure. In the display device 100 according to the second modification of the preferred embodiment, the first selective-wavelength-reflection layer 41a has an optical-input surface provided with the first circularly-polarized-light reflection member 41a1, and an optical-output surface provided with the second circularly-polarized-light reflection member 41a2. In addition, the second selective-wavelength-reflection layer 41b has an optical-input surface provided with the third circularly-polarized-light reflection member 41b1, and an optical-output surface provided with the fourth circularly-polarized-light reflection member 41b2. The first circularly-polarized-light reflection member 41a1, the second circularly-polarized-light reflection member 41a2, the third circularly-polarized-light reflection member 41b1, and the fourth circularly-polarized-light reflection member 41b2 can have the same shape. Thus in using a mask for instance, the first circularly-polarized-light reflection member 41al, the second circularly-polarized-light reflection member 41a2, the third circularly-polarized-light reflection member 41b1, and the fourth circularly-polarized-light reflection member 41b2 can be formed using the same mask.

As described above, the display device 100 according to the second modification of the preferred embodiment is similar in configuration to the display device 100 according to the preferred embodiment with the exception that each of the first selective-wavelength-reflection layer 41a and second selective-wavelength-reflection layer 41b has a stacked structure. Like components will be thus denoted by the same signs and will not be elaborated upon here.

The above configuration enables the first selective-wavelength-reflection layer 41a and second selective-wavelength-reflection layer 41b to reflect light having a peak wavelength that passes through the blue transmissive filter 61b and constitutes both clockwise- and counterclockwise-circularly polarized light beams.

When composed of a cholesteric liquid crystal or chiral nematic liquid crystal, the first circularly-polarized-light reflection member 41al and third circularly-polarized-light reflection member 41b1, or the second circularly-polarized-light reflection member 41a2 and fourth circularly-polarized-light reflection member 41b2 can reflect a half of linearly polarized light contained in incident light.

In some cases, the first selective-wavelength-reflection layer 41a and the second selective-wavelength-reflection layer 41b have their stacked structures as described above, and incident light contains circularly polarized light and linearly polarized light. Accordingly, halves of the circularly polarized light and linearly polarized light can reflect on the second circularly-polarized-light reflection member 41a2 and fourth circularly-polarized-light reflection member 41b2. The remaining, non-reflected linearly polarized light passes through the second circularly-polarized-light reflection member 41a2 and fourth circularly-polarized-light reflection member 41b2 and then reflects on the first circularly-polarized-light reflection member 41al and third circularly-polarized-light reflection member 4b1, both of which are disposed on a surface of the reflective layer 24 adjacent to the display surface.

As such, the display device 100 according to the second modification enables the first selective-wavelength-reflection layer 41a and second selective-wavelength-reflection layer 41b to properly reflect light of a wavelength band that passes through the blue transmissive filter 61b even when a circularly polarized light beam and a linearly polarized light beam are mixed together within the liquid crystal cell 20.

Third Modification

Figure 5:
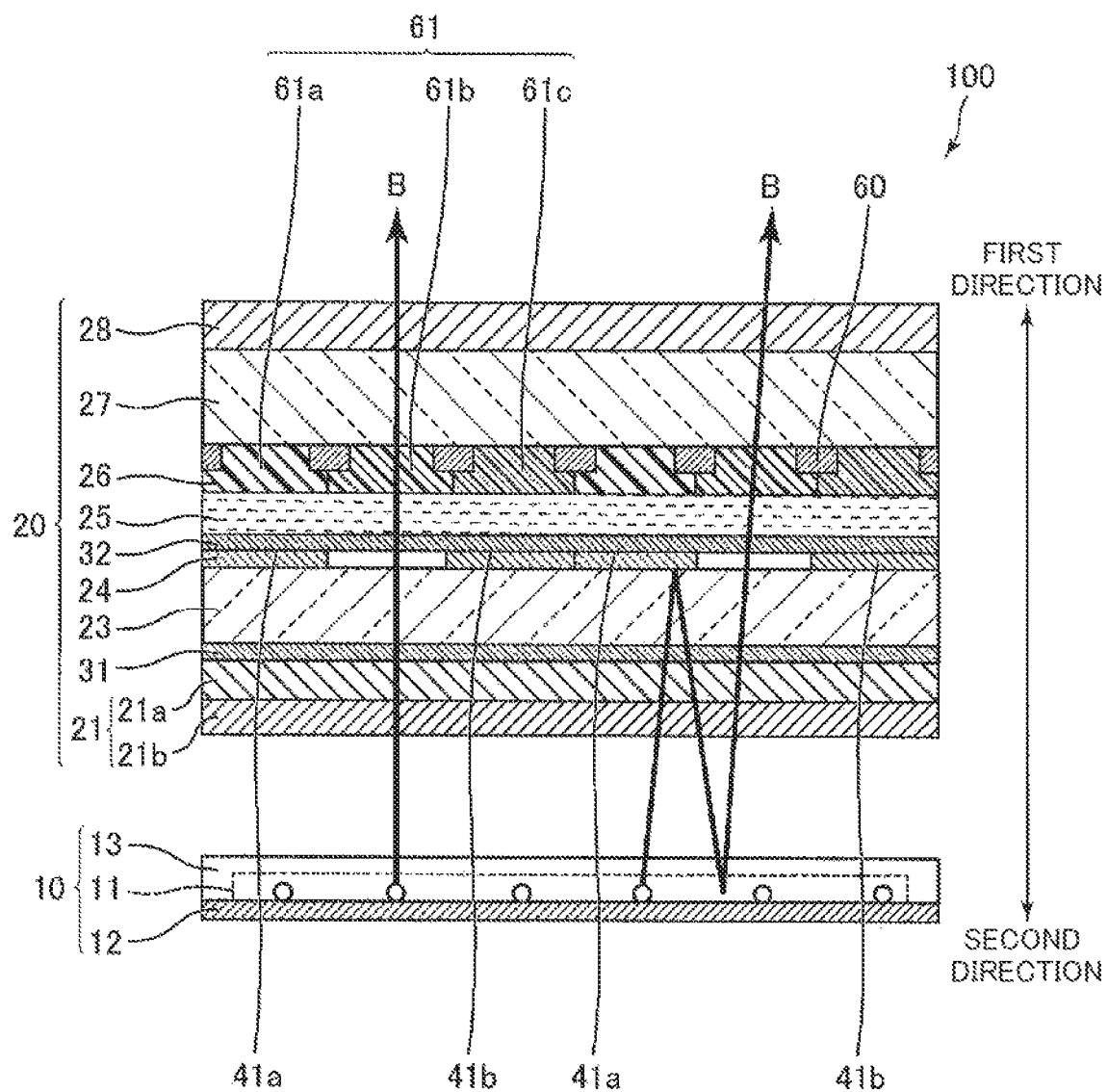
FIG. 5 is a schematic sectional view of the display device according to a third modification of the preferred embodiment of the present disclosure.

With reference to FIG. 5, the following describes the display device 100 according to a third modification. The display device 100 according to the third modification of the preferred embodiment is different in configuration from the display device 100 according to the preferred embodiment in that a first waveplate 31 and a second waveplate 32 are provided. The first waveplate 31 converts linearly polarized incident light into circularly polarized light, and the second waveplate 32 converts circularly polarized incident light into linearly polarized light. In addition, the first selective-wavelength-reflection layer 41a and the second selective-wavelength-reflection layer 41b reflect circularly polarized light.

To be specific, the first waveplate 31 is adjacent to the optical-input surface of the reflective layer 24 (the first selective-wavelength-reflection layer 41a and second selective-wavelength-reflection layer 41b), as illustrated in FIG. 5. FIG. 5 illustrates an instance where the first waveplate 31 is interposed between the first polarizer plate 21 and first glass substrate 23. Furthermore, the second waveplate 32 is adjacent to the optical-output surface of the reflective layer 24 (the first selective-wavelength-reflection layer 41a and second selective-wavelength-reflection layer 41b). FIG. 5 illustrates an instance where the second waveplate 32 is interposed between the reflective layer 24 and liquid crystal layer 25. The first waveplate 31 and the second waveplate 32 are in-cell ¼λ plates disposed within the liquid crystal cell 20. The in-cell ¼λ plates can be formed through application, such as spin coating, onto a substrate.

The display device 100 according to the third modification is configured such that linearly polarized light (B) passed through the first polarizer plate 21 enters with its polarization surface inclined at 45° azimuth angle with respect to the slow axis of the first waveplate 31. This enables the linearly polarized light (B) to be converted into circularly polarized light. The circularly polarized light (B) can be reflected by the first selective-wavelength-reflection layer 41a and second selective-wavelength-reflection layer 41b of the reflective layer 24. In contrast, circularly polarized light (B) passed through the blue transmissive filter 61b is converted into linearly polarized light reversibly by the second waveplate 32.

Figure 6:
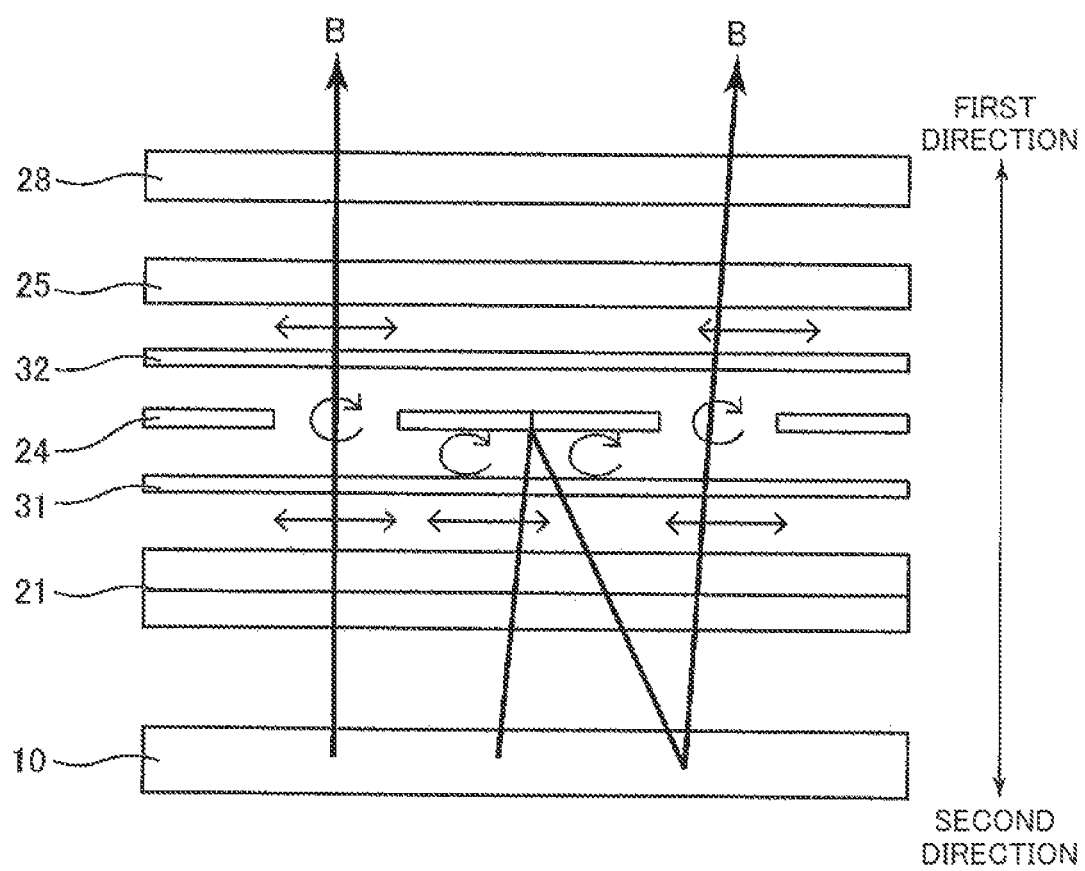
FIG. 6 schematically illustrates an optical path and polarization of light in the display device shown in FIG. 5.

With reference to FIG. 6, the following describes an optical path and polarization of light in the display device 100 according to the third modification. FIG. 6 schematically illustrates an optical path and polarization of light in the display device 100 shown in FIG. 5. For convenience in description, FIG. 6 only illustrates members relating to light polarization, and the liquid crystal layer 25. That is, the backlight 10, first polarizer plate 21, first waveplate 31, reflective layer 24, second waveplate 32, liquid crystal layer 25, and second polarizer plate 28, all disposed on the back surface of the display device 100 in this order, are shown in the drawing, and the other members are omitted. Arrows extending in the side-to-side direction on the drawing sheet of FIG. 6 indicate that light is linearly polarized. In addition, clockwise arrows indicate that light is clockwise circularly polarized.

Among light beams emitted in the first direction from the backlight 10, linearly polarized light (B) having a polarization surface along the transmission axis of the first polarizer plate 21 enters the first waveplate 31. The light (B) entered the first waveplate 31 changes from linearly polarized light to circularly polarized light (e.g., clockwise-circularly polarized light). Among the circularly polarized light beams (B), light traveling toward the red transmissive filter 61a and green transmissive filter 61c reflects on the reflective layer 24 (the first selective-wavelength-reflection layer 41a and second selective-wavelength-reflection layer 41b) and then travels in the second direction.

Unlike mirror-reflected light, clockwise-circularly polarized light (B) reflected by the first selective-wavelength-reflection layer 41a and second selective-wavelength-reflection layer 41b composed of a cholesteric liquid crystal enters the first waveplate 31 as-is. The light (B) entered the first waveplate 31 is converted from circularly polarized light to linearly polarized light by the first waveplate 31 and then enters the first polarizer plate 21.

The light (B) entering the first polarizer plate 21 has a polarization surface along the transmission axis of the first polarizer plate 21. The light (B) thus passes through the first polarizer plate 21 and then travels toward the backlight 10.

The light (B) traveled toward the backlight 10 reflects on the reflector 12 of the backlight 10 and again travels in the first direction. The light (B) traveling in the first direction has a polarization surface along the transmission axis of the first polarizer plate 21. The light (B) thus passes through the first polarizer plate 21 and then enters the first waveplate 31.

The light (B) entered the first waveplate 31 changes from linearly polarized light to circularly polarized light (clockwise-circularly polarized light). Here, circularly polarized light (B) that transmits, as-is, without reflecting on the first selective-wavelength-reflection layer 41a and second selective-wavelength-reflection layer 41b of the reflective layer 24 enters the second waveplate 32.

The light (B) entered the second waveplate 32 changes from circularly polarized light to linearly polarized light and then enters the liquid crystal layer 25. The light (B) entered the liquid crystal layer 25 passes through the blue transmissive filter 61b of the color filter 26 and then exits via the second glass substrate 27 and second polarizer plate 28.

When the first waveplate 31 and the second waveplate 32 are arranged in such a manner that their slow axes are orthogonal to each other, a light beam entering the first waveplate 31 and a light beam exiting from the second waveplate 32 constitute the same linearly polarized light. In contrast, when the first waveplate 31 and the second waveplate 32 are arranged in such a manner that the directions of their slow axes coincide with each other, a light beam entering the first waveplate 31 and a light beam exiting from the second waveplate 32 constitute linearly polarized light beams having their polarization surfaces orthogonal to each other. It is noted that the configuration where a light beam entering the first waveplate 31 and a light beam exiting from the second waveplate 32 constitute the same linearly polarized light is more preferable, because this configuration is less affected by wavelength dependence.

Fourth Modification

Figure 7:
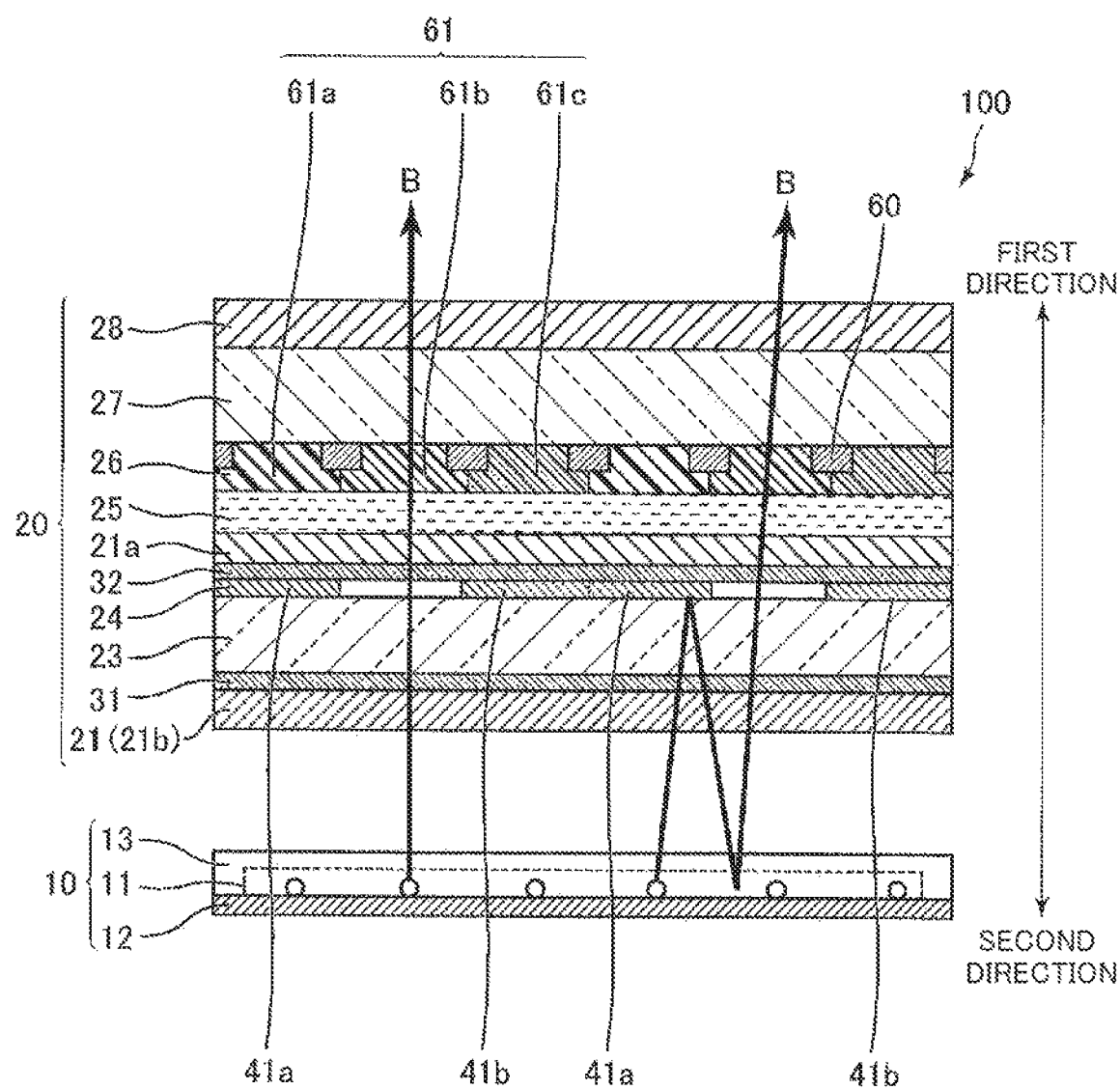
FIG. 7 is a schematic sectional view of the display device according to a fourth modification of the preferred embodiment of the present disclosure.

With reference to FIG. 7, the following describes the display device 100 according to a fourth modification. FIG. 7 is a schematic sectional view of the display device 400 according to the fourth modification of the preferred embodiment of the present disclosure. The display device 100 according to the fourth modification is different in configuration from the display device 100 according to the preferred embodiment in that the first waveplate 31, which converts linearly polarized incident light into circularly polarized light, and the second waveplate 32, which converts circularly polarized incident light into linearly polarized light, are provided. In addition, the first selective-wavelength-reflection layer 41a and the second selective-wavelength-reflection layer 41b reflect circularly polarized light.

Another difference is that the reflective polarizer plate 21b (third polarizer plate) of the first polarizer plate 21 is adjacent to the optical-input surface of the reflective layer 24 (the first selective-wavelength-reflection layer 41a and second selective-wavelength-reflection layer 41b), and that the absorptive polarizer plate 21a (fourth polarizer plate) is adjacent to the optical-output surface of the reflective layer 24. FIG. 7 illustrates an instance where the absorptive polarizer plate 21a, an in-cell polarizer, is adjacent to the optical-output surface of the reflective layer 24 and is interposed between the second waveplate 32 and liquid crystal layer 25.

As described above, the display device 100 according to the fourth modification, which includes the first polarizer plate 21 composed of the reflective polarizer plate 21b alone, more reduces the degree of polarization of the first polarizer plate 21 than the display device 100 according to the preferred embodiment. Here, the degree of polarization refers to a measure indicating the polarization of light passed through the first polarizer plate 21. The degree of polarization is thus expressed by Expression 1 indicated below, where $H_0$ denotes transmittancy in parallel Nicols, where $H_{90}$ denotes transmittancy in crossed Nicols.

[Expression 1]

$$\frac{\sqrt{H_0 - H_{90}}}{\sqrt{H_0 + H_{90}}} \times 100(\%) \qquad (1)$$

Light reflected on the first selective-wavelength-reflection layer 41a and second selective-wavelength-reflection layer 41b passes through the first polarizer plate 21, adjacent to the optical-input surfaces of the first selective-wavelength-reflection layer 41a and second selective-wavelength-reflection layer 41b, and then reaches the backlight 10. The light reached the backlight 10 reflects on the backlight 10 and passes again through the first polarizer plate 21 to travel toward the color filter 26. In this way, reflected light passes through the first polarizer plate 21 multiple times. Reflected light undergoes absorption and other processing every time it passes through the first polarizer plate 21, thus being lost in some cases.

The display device 100 according to the fourth modification can be configured such that the first polarizer plate 21, adjacent to the optical-input surfaces of the first selective-wavelength-reflection layer 41a and second selective-wavelength-reflection layer 41b, has a reduced degree of polarization. This can prevent a loss that occurs when light passes through the first polarizer plate 21. The first polarizer plate 21 that is composed of only the reflective polarizer plate 21b can particularly prevent absorption of reflected light.

Figure 8:
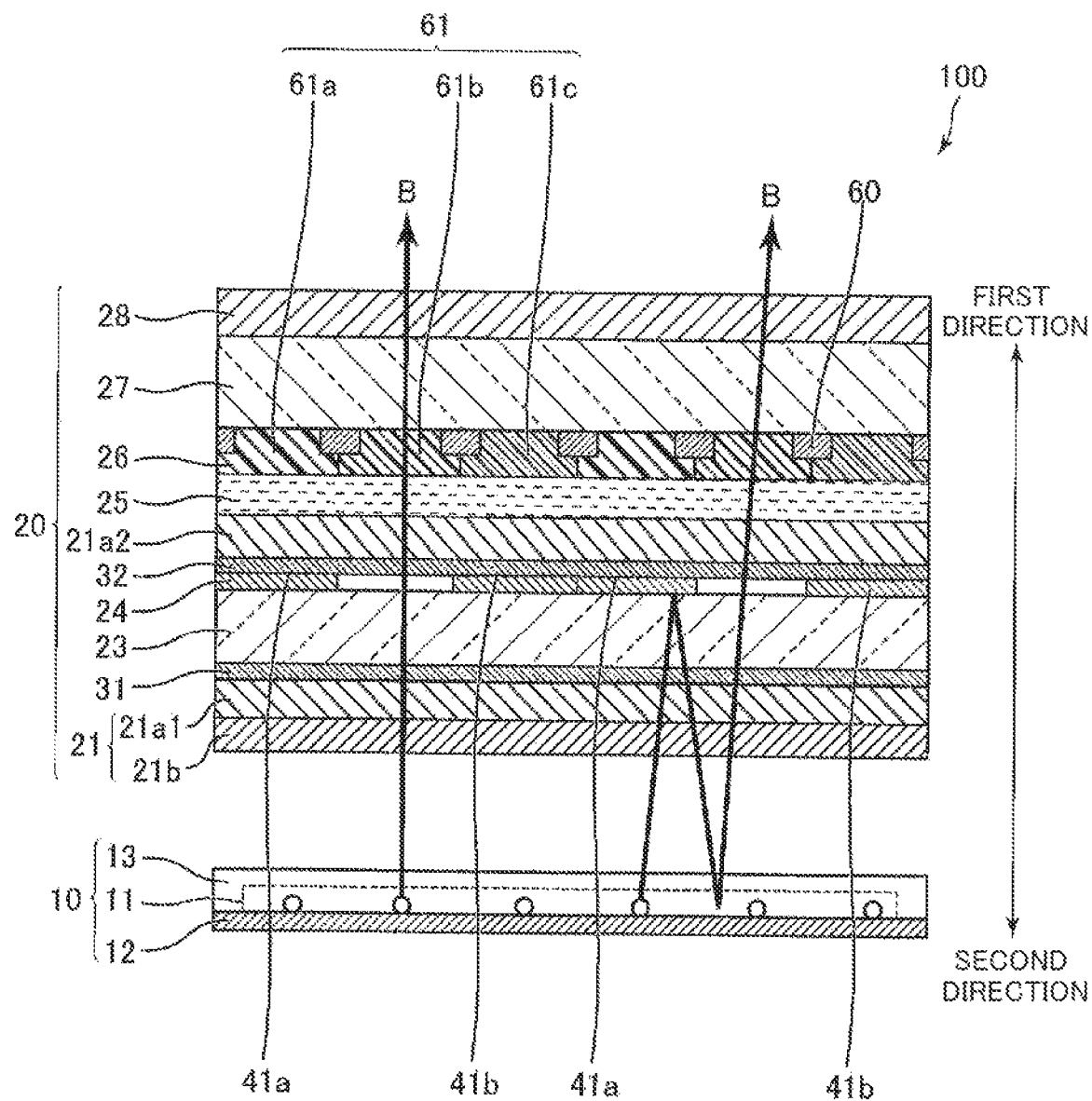
FIG. 8 is a schematic sectional view of the display device according to the fourth modification of the preferred embodiment of the present disclosure.

The foregoing has described that the display device 100 according to the fourth modification is configured such that the first polarizer plate 21 is composed of the reflective polarizer plate 21b, and that the absorptive polarizer plate 21a is adjacent to the optical-output surface of the reflective layer 24. Some preferred embodiments provide a configuration as illustrated in FIG. 8, where the first polarizer plate 21 is composed of the reflective polarizer plate 21b, and an absorptive polarizer plate (first absorptive polarizer plate 21a1) having a lower degree of polarization than the absorptive polarizer plate 21a of the display device 100 according to the preferred embodiment. To compensate for the lower degree of polarization, another absorptive polarizer plate (second absorptive polarizer plate 21a2) may be provided close to the optical-output surfaces of the first selective-wavelength-reflection layer 41a and second selective-wavelength-reflection layer 41b. FIG. 8 is a schematic sectional view of the display device 100 according to the fourth modification of the preferred embodiment of the present disclosure.

Even in the configuration in FIG. 8, the display device 100 according to the fourth modification can reduce the degree of polarization of the first polarizer plate 21, thereby preventing the first polarizer plate 21 from light absorption.

The display devices 100 according to the preferred embodiment and first to fourth modifications each include the color filter 26 having the red transmissive filter 61a, blue transmissive filter 61b and green transmissive filter 61c. In some preferred embodiments, the color filter 26 may have a white transmissive filter (a blank) in addition to the red transmissive filter 61a, blue transmissive filter 61b and green transmissive filter 61c. The display device 100 that includes the color filter 26 having a white transmissive filter can enhance the transmittancy of light emitted from the backlight 10, to thus improve brightness. When the color filter 26 has a white transmissive filter, the reflective layer 24 includes no selective-wavelength-reflection layer at a location corresponding to a region through which light entering the white transmissive filter passes.

Alternatively, the color filter 26 may have a yellow transmissive filter in addition to the red transmissive filter 61a, blue transmissive filter 61b and green transmissive filter 61c. The display device 100 that includes the color filter 26 having a yellow transmissive filter can broaden the range of color reproducibility. When the color filter 26 has a yellow transmissive filter, whether to provide a selective-wavelength-reflection layer in the reflective layer 24, at a location corresponding to a region through which light entering the yellow transmissive filter passes is determined in accordance with the wavelength band of light that is reflected by the first selective-wavelength-reflection layer 41a and second selective-wavelength-reflection layer 41b of the reflective layer 24.

For instance, when the wavelength band of light that passes through the yellow transmissive filter and the wavelength band of light that is reflected by the first selective-wavelength-reflection layer 41a and second selective-wavelength-reflection layer 41b are close to each other, so that the wavelength bands overlap for the most part, no selective-wavelength-reflection layer is provided at a location corresponding to a region through which light entering the yellow transmissive filter passes. Conversely, when the wavelength band of light that passes through the yellow transmissive filter and the wavelength band of light that is reflected by the first selective-wavelength-reflection layer 41a and second selective-wavelength-reflection layer 41b are away from each other, a selective-wavelength-reflection layer is provided at a location corresponding to a region through which light entering the yellow transmissive filter passes. This can promote effective use of light (B) of a wavelength band that passes through the blue transmissive filter 61b.

The foregoing has described, by way of example, a configuration where the display devices 100 according to the preferred embodiment and first to fourth modifications each include selective-wavelength-reflection layers that reflect light (B) of a wavelength band that passes through the blue transmissive filter 61b, thereby using light (B) effectively. In such a configuration, the use efficiency of light (B) improves considerably, possibly causing out-of-balance in red (R), green (G) and blue (B). For possible out-of-balance in color, a configuration capable of maintaining this color balance is required.

Figure 9:
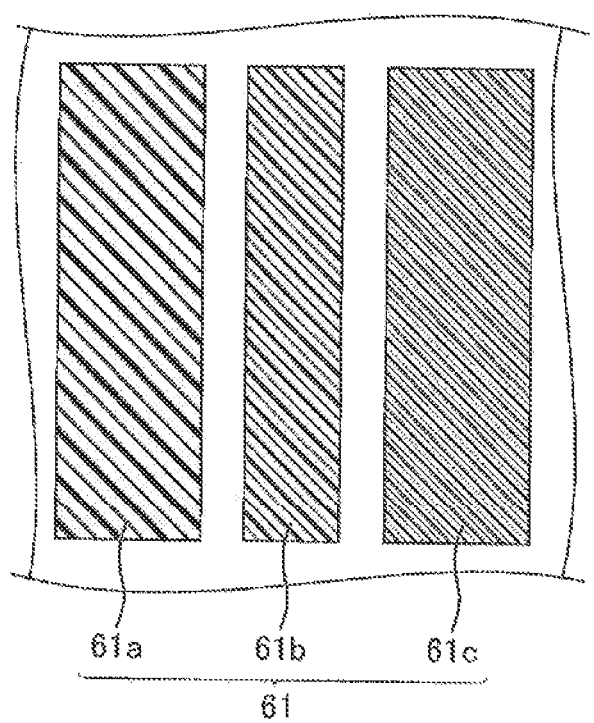
FIG. 9 is a partial enlarged view of main components of a color filter included in the display device according to the preferred embodiment of the present disclosure.

Specifically, to improve the use efficiency of light (B) for instance, the display device 100 is configured such that the blue transmissive filter 61b corresponding to a blue sub-pixel is smaller in area than each of the red transmissive filter 61a corresponding to a red sub-pixel and the green transmissive filter 61c corresponding to a green sub-pixel, as illustrated in FIG. 9. FIG. 9 is a partial enlarged view of main components of the color filter 26 included in the display device 100 according to the preferred embodiment of the present disclosure. As illustrated in FIG. 9, the red transmissive filter 61a and the green transmissive filter 61c are of the same area, and the blue transmissive filter 61b is smaller in area than the red transmissive filter 61a and green transmissive filter 61c.

For convenience in description, FIG. 9 illustrates an instance where the color filter 26 includes the same number of red transmissive filters 61a, blue transmissive filters 61b and green transmissive filters 61c. In some preferred embodiments, the color filter 26 does not necessarily include the same number of red transmissive filters 61a, blue transmissive filters 61b and green transmissive filters 61c, depending on the arrangement pattern of sub-pixels. Area comparisons between the red transmissive filter 61a, blue transmissive filter 61b and green transmissive filter 61c in the color filter 26 thus refers to comparisons in total area between the red transmissive filter 61a, blue transmissive filter 61b and green transmissive filter 61c in the color filter 26.

The display device 100, which is configured such that the blue transmissive filter 61b in the color filter 26 is smaller in area than each of the red transmissive filter 61a and green transmissive filter 61c in the color filter 26, can maintain the color balance.

The first selective-wavelength-reflection layer 41a and the second selective-wavelength-reflection layer 41b are provided so as to correspond to the red transmissive filter 61a and green transmissive filter 61c. The first selective-wavelength-reflection layer 41a and the second selective-wavelength-reflection layer 41b can thus have a large area per unit area in the reflective layer 24 when, as illustrated in FIG. 9, the area of the blue transmissive filter 61b is smaller than the area of each of the red transmissive filter 61a and green transmissive filter 61c. The display device 100 can consequently enhance the use efficiency of light.

The foregoing has described the configuration of the display device 100 by using an example liquid crystal display that includes the backlight 10 on its backside, and that irradiates the liquid crystal cell 20 with light from the backlight 10. The display device 100 is not limited to such a liquid crystal display. The display device 100 may be an OLED display that achieves full color by using a white OLED and the color filter 26.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A display device comprising:
a color filter including a first transmissive filter, a second transmissive filter, and a third transmissive filter, the first, the second, and the third transmissive filters being configured to transmit respective light beams having peak wavelengths different from each other;
a first selective-wavelength-reflection layer adjacent to an optical-input surface of the first transmissive filter, the first selective-wavelength-reflection layer being configured to reflect light of a wavelength band that passes through the third transmissive filter;
a second selective-wavelength-reflection layer adjacent to an optical-input surface of the second transmissive filter, the second selective-wavelength-reflection layer being configured to reflect light of a wavelength band that passes through the third transmissive filter, the second selective-wavelength-reflection layer being identical in composition to the first selective-wavelength-reflection layer; and
a light emitter configured to emit light that travels toward the color filter,
wherein the first and the second selective-wavelength-reflection layers comprise a reflective member configured to reflect circularly polarized light.

2. The display device according to claim 1, wherein the first and the second selective-wavelength-reflection layers comprise a single structure.

3. The display device according to claim 1, wherein the first and the second selective-wavelength-reflection layers comprise respective separate structures.

4. The display device according to claim 1, wherein
the first transmissive filter includes a red transmissive filter configured to transmit light of a wavelength band ranging at least from 620 nm inclusive to 680 nm inclusive,
the second transmissive filter includes a green transmissive filter configured to transmit light of a wavelength band ranging at least from 520 nm inclusive to 580 nm inclusive,
the third transmissive filter includes a blue transmissive filter configured to transmit light of a wavelength band ranging at least from 420 nm inclusive to 480 nm inclusive, and
the first and the second selective-wavelength-reflection layers reflect the light of the wavelength band ranging at least from 420 nm inclusive to 480 nm inclusive.

5. The display device according to claim 4, wherein
the red, the green, and the blue transmissive filters are arranged so as to respectively correspond to a red sub-pixel, a green sub-pixel, and a blue sub-pixel, and
the blue transmissive filter in the color filter is smaller in area than each of the red and the green transmissive filters in the color filter.

6. The display device according to claim 1, further comprising:
a liquid crystal layer; and
a first glass substrate and a second glass substrate sandwiching the liquid crystal layer and each having an electrode,
wherein the liquid crystal layer and the first glass substrate are adjacent to an optical-input surface of the color filter,
the second glass substrate is adjacent to an optical-output surface of the color filter, and
the first and the second selective-wavelength-reflection layers are disposed between the liquid crystal layer and the first glass substrate.

7. The display device according to claim 1, further comprising:
a liquid crystal layer; and
a first glass substrate and a second glass substrate sandwiching the liquid crystal layer and each having an electrode,
wherein the first glass substrate is adjacent to an optical-input surface of the color filter,
the liquid crystal layer and the second glass substrate are adjacent to an optical-input surface of the color filter, and the first and the second selective-wavelength-reflection layers are disposed between the color filter and the first glass substrate.

8. The display device according to claim 1, wherein the first and the second selective-wavelength-reflection layers comprise a reflective member having a stack of a first reflective member and a second reflective member, the first reflective member being configured to reflect counterclockwise-circularly polarized light, the second reflective member being configured to reflect clockwise-circularly polarized light.

9. The display device according to claim 1, further comprising:
a first waveplate adjacent to optical-input surfaces of the first and the second selective-wavelength-reflection layers, the first waveplate being configured to convert linearly polarized incident light into circularly polarized light; and
a second waveplate adjacent to optical-output surfaces of the first and the second selective-wavelength-reflection layers, the second waveplate being configured to convert circularly polarized incident light into linearly polarized light.

10. The display device according to claim 1, wherein the light emitter is a light-emitting diode (LED) light source configured to emit three colors of light comprising red (R), green (G), and blue (B).

11. A display device comprising:
a color filter including a first transmissive filter, a second transmissive filter, and a third transmissive filter, the first, the second, and the third transmissive filters being configured to transmit respective light beams having peak wavelengths different from each other;
a first selective-wavelength-reflection layer adjacent to an optical-input surface of the first transmissive filter, the first selective-wavelength-reflection layer being configured to reflect light of a wavelength band that passes through the third transmissive filter;
a second selective-wavelength-reflection layer adjacent to an optical-input surface of the second transmissive filter, the second selective-wavelength-reflection layer being configured to reflect light of a wavelength band that passes through the third transmissive filter, the second selective-wavelength-reflection layer being identical in composition to the first selective-wavelength-reflection layer;
a light emitter configured to emit light that travels towards the color filter;
a liquid crystal layer;
a first polarizer plate adjacent to an optical-input surface of the liquid crystal layer; and
a second polarizer plate adjacent to an optical-output surface of the liquid crystal layer,
wherein the first polarizer plate includes
a third polarizer plate adjacent to optical-input surfaces of the first and the second selective-wavelength-reflection layers, and
a fourth polarizer plate adjacent to optical-output surfaces of the first and the second selective-wavelength-reflection layers.

12. The display device according to claim 11, wherein the third polarizer plate includes a reflective polarizer plate configured to reflect a component of polarized light that is not allowed to pass through the third polarizer plate, and
the fourth polarizer plate includes an absorptive polarizer plate configured to absorb a component of polarized light that is not allowed to pass through the fourth polarizer plate.

13. The display device according to claim 11, wherein the first and the second selective-wavelength-reflection layers comprise a single structure.

14. The display device according to claim 11, wherein the first and the second selective-wavelength-reflection layers comprise respective separate structures.

15. The display device according to claim 11, wherein the first transmissive filter includes a red transmissive filter configured to transmit light of a wavelength band ranging at least from 620 nm inclusive to 680 nm inclusive,
the second transmissive filter includes a green transmissive filter configured to transmit light of a wavelength band ranging at least from 520 nm inclusive to 580 nm inclusive,
the third transmissive filter includes a blue transmissive filter configured to transmit light of a wavelength band ranging at least from 420 nm inclusive to 480 nm inclusive, and
the first and the second selective-wavelength-reflection layers reflect the light of the wavelength band ranging at least from 420 nm inclusive to 480 nm inclusive.

16. The display device according to claim 15, wherein the red, the green, and the blue transmissive filters are arranged so as to respectively correspond to a red sub-pixel, a green sub-pixel, and a blue sub-pixel, and
the blue transmissive filter in the color filter is smaller in area than each of the red and the green transmissive filters in the color filter.

17. The display device according to claim 11, wherein the light emitter is a light-emitting diode (LED) light source configured to emit three colors of light comprising red (R), green (G), and blue (B).

* * * * *